United States Patent [19]

Martin

[11] Patent Number: 4,527,602
[45] Date of Patent: Jul. 9, 1985

[54] DUPLICATING ATTACHMENT FOR LATHE

[76] Inventor: Thomas E. Martin, Rte. 15, Box 231, Lexington, N.C. 27292

[21] Appl. No.: 505,929

[22] Filed: Jun. 20, 1983

[51] Int. Cl.³ .............................................. B23B 3/28
[52] U.S. Cl. ........................................ 142/55; 142/7
[58] Field of Search ................ 142/7, 1, 55; 82/14 R

[56] References Cited

U.S. PATENT DOCUMENTS

| 1,540,801 | 6/1925 | O'Neel | 142/1 |
| 3,512,561 | 5/1970 | Cortez | 142/55 |
| 3,635,265 | 1/1972 | Cortez | 142/7 |

FOREIGN PATENT DOCUMENTS 583937  9/1959  Canada ................................. 142/7

*Primary Examiner*—Leonidas Vlachos
*Attorney, Agent, or Firm*—Donald L. Weinhold, Jr.

[57] ABSTRACT

A duplicating attachment for an ordinary turning lathe which includes means for converting a conventional wood or metal lathe into a precise but simple tool for duplicating a particular pattern or model turning. Means are provided to attach a pattern or template to a lathe which is manually traced by an operator with a feeler member. Means are provided to interconnect the said feeler member or tracing element with a rotary cutting tool which contacts and cuts a lathe-rotated work piece simultaneously with the tracing operation, creating an exact replica of the pattern or template.

1 Claim, 6 Drawing Figures

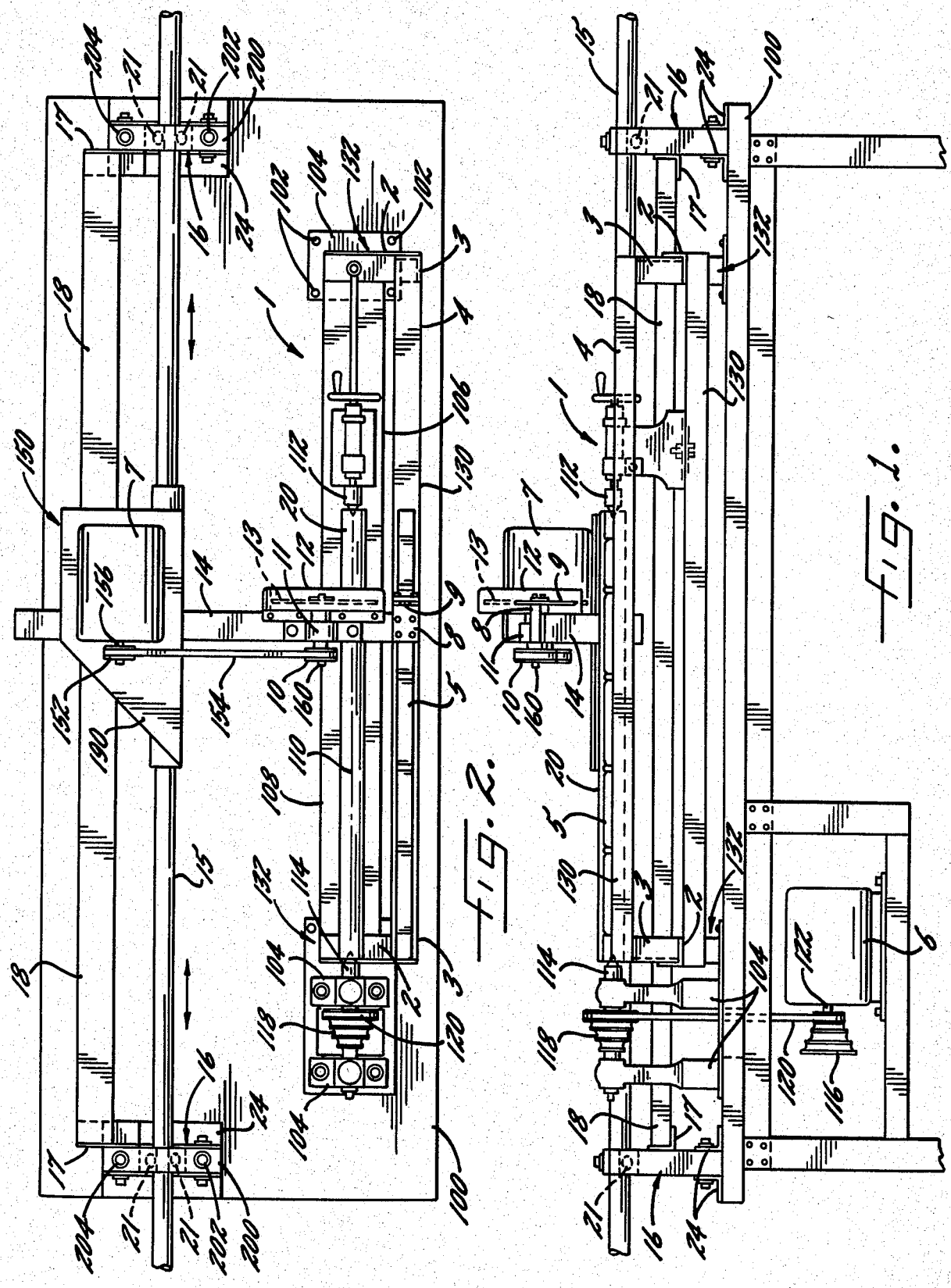

DUPLICATING ATTACHMENT FOR LATHE

BACKGROUND OF THE INVENTION

Home workshops are sometimes equipped with turning lathes having multiple utility for the hand craftsman. Because of the general expense and complexity of duplicating equipment, most home workshops are not equipped with any type of copying apparatus for precisely duplicating existing turnings or specific patterns. Consequently, the time honored and laborious process of starting, turning, cutting, stopping, and measuring in a trial-and-error type cycle, has served the home handyman as well as the professional wood and metal workers.

Complex linkages, drive mechanisms, and mechanical components make existing duplicating tools quite expensive and over-complicated for common, non-industrial use. Moreover, the availability of a simple and relatively inexpensive attachment for simple lathe equipment which is also accurate and dependable is virtually nonexistent in the present state of the art to the best knowledge of applicant.

SUMMARY OF THE INVENTION

The copying attachment for turning lathes of the present invention is characterized by a simple assembly which combines a motor driven rotary cutting tool or saw with a feeler element which traces the profile of the model or template. As the feeler element contacts the template, and moves along the exact contour of the model to be duplicated as it traces two dimensions of the template face, the cutting tool moves to the exact dimension as does the feeler element. As the cutting tool moves in concert with the feeler element, the cutting edge of the said cutting tool contacts a length of rotating stock which exactly duplicates the model.

It is, therefore, an object of the present invention to provide a simple duplicating attachment for any complexity level of metal or wood working lathes.

It is further an object of the present invention to make a more accurate and a better quality reproduction of a model or pattern by using a rotating cutting blade rather than a stationary tool in conjunction with the rotating stock.

It is further an object of this invention to provide an inexpensive and easily operable duplicating attachment for all types of turning lathes.

It is yet a further object of this invention to provide a simple duplicating attachment for a wood working lathe which utilizes a portable circular saw commonly referred to as a skill saw in combination with the present invention for utility as the cutting tool for a duplicating attachment for a wood or metal lathe.

Thus it may be seen that the invention establishes a simple, inexpensive, and accurate attachment for any wood or metal turning lathe to allow a particular design to be duplicated with precision.

Other objects and advantages of the present invention will become apparent to those skilled in the art after considering the following detailed specification which discloses a preferred embodiment thereof in conjunction with the accompanying drawings, wherein:

BRIEF DESCRIPTION OF DRAWING

FIG. 1 is a front elevation of a simple turning lathe complete with the duplicating attachment of the present invention.

FIG. 2 is a plan view of a simple turning lathe in combination with duplicating attachment of the present invention.

DETAILED DESCRIPTION OF THE DRAWINGS

Figure 3:
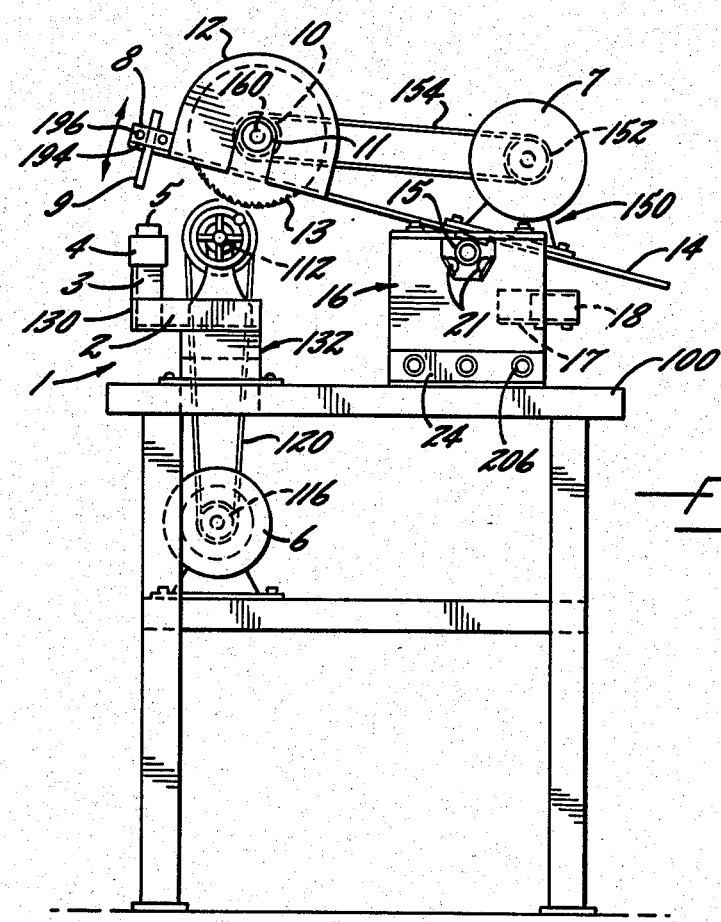
FIG. 3 is a side elevation of a simple turning lathe complete with the duplicating attachment of the present invention.

Referring first to FIGS. 1, 2, and 3, the preferred embodiment of the invention is shown as an attachment to an ordinary turning lathe, generally designated as 1. Turning lathe, 1, is generally supported on a stand, table, or bench, generally referred to as 100. Turning lathe, 1, is securly attached to stand, 100, by means of any suitable fastener such as bolts or screws, 102, as shown in FIG. 2 through standards, 104, located on each end of lathe, 1. Lathe, 1, may be referred to as having a front side, 106, or the side generally facing the operator as shown in FIG. 2. The back side, 108, is generally located on the side fartherest away from the operator as shown in FIG. 2.

A work piece, 20, comprised of a length of raw stock, is supported at its terminal ends for rotation about its longitudinal axis, 110, by supports, 112 and 114. Conventional motor, 6, as shown in FIGS. 1 and 3, mechanically interconnect supports 114 by any expedient means such as pulleys, 116 and 118, and drive belt, 120. As motor shaft, 122, is caused to rotate by motor, 6, work piece, 20, is likewise caused to rotate through the mechanical linkages, 114, 116, 118, and 120.

Bringing the cutting surface of a tool into contact with rotating work piece, 20, causes an erosion of work piece, 20, at the point of contact with the said cutting surface of the cutting tool permitting an operator to precisely design a finished work piece to any desired dimension about a longitudinal axis, 110, depending on the location and force of the cutting tool. In the preferred embodiment, the cutting tool is a circular saw blade, 13.

Disposed on the front side, 106, of lathe, 1, is one element of the attachment, which is the subject of the instant invention, generally referred to as template support, 130. In the preferred embodiment, template support, 130, is comprised of terminal support members, 132, located in the preferred embodiment, in a spatially separated disposition outside of lathe supports 112, and 114. Horizontal angle iron, 2, is integrally attached to supports, 132, by any conventional means such as welding, so that horizontal angle irons, 2, in conjunction with integrally attached vertical angle iron, 3, and solid horizontal member, 4, locates a template, 5, in front of work piece, 20. Members 2, 3, and 4, are so dimensioned in position that when a pattern or template, 5, is releasably attached to the top surface of solid horizontal member, 4, said template, 5, may be precisely positioned to the front of rotating work piece, 20, at precisely the same elevation, and at a convenient distance in front of work piece, 20, so that the duplicating attachment of the instant invention may be utilized as hereinafter set forth. Solid horizontal member, 4, is preferably made of wood so that releasable attachment of the template, 5, secured to the solid horizontal support member, 4, may be facilitated. Thus it may be seen that support elements, 2, 3, and 4, are integrally affixed to each other in such a relation as to position the template, 5, attached thereto, properly in front of work piece, 20. The assembly of elements, 2, 3, and 4, are stationary and all securely attached to the top surface of work table, 100, upon which lathe, 1, is attached.

Figure 6:
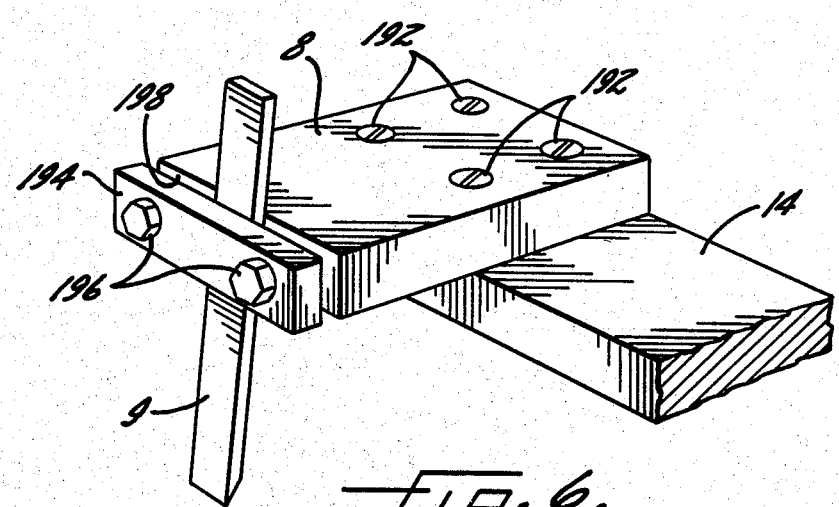
FIG. 6 is a prospective view of the mounting element which adapts the duplicating attachment of the present invention for use in combination with a portable hand carried circular saw.

Located on the rear side, 108, of lathe, 1, is the support element generally referred to as 150, of the cutting tool apparatus of the attachment of the instant invention. In the preferred embodiment, rotating saw blade, 13, contacts rotating work piece, 20, in order to shape the length of rotating stock, 20, to form the finished turning. Blade, 13, is rotated either by mechanical connection to motor, 7, or by means of a conventional circular hand saw, 27. Blade, 13, is connected to motor, 7, and caused to rotate by means of pulleys, 10 and 152, and drive belt, 154. As drive shaft, 156, is caused to turn by motor, 7, pulley, 152, belt, 154, and pulley, 10, rotates blade, 13. In the alternative, circular saw, 27, is energized and turned on in order to rotate blade, 13. The upper half of blade, 13, is housed within protective guard, 12, for safety purposes to prevent accidental contact of the operator with rotating blade, 13, and to channel cut particles and chips from cut work piece, 20, away from the operator. Pulley, 10, is securely attached to shaft, 160, upon which blade, 13, is securely attached and which rotates as does pulley, 10. Shaft, 160, is journaled and rotated through bearing, 11, which supports shaft, 160, and consequently, blade, 13. Bearing, 11, is housed within any conventional housing standard and is attached to support plate, 14, constructed of some sturdy, non-deformable material such as steel. Attached adjacent to the rear end of support plate, 14, is support bracket, 190, which supports motor, 7. Located adjacent to the forward end of support plate, 14, which extends beyond bearing, 11, and blade, 13, is bracket, 8, shown most clearly in FIG. 6. Bracket, 8, is comprised of a durable, non-deforming material such as steel and is attached securely to support plate, 14, by means of any releaseable expedient such as screws, 192. Bracket, 8, is sized so that it protrudes in at least one dimension beyond the width of support plate, 14. Located along end, 198, of bracket, 8, which protrudes beyond the width of support plate, 14, is clamp, 194, releasably secured to the said end, 198, of bracket, 8, by means of bolts, 196, passing through clam, 194, and into drilled and tapped holes located in said end, 198, of bracket, 8, which receives said bolts, 196. By tightening the bolts, 196, clamp, 194, may be moved into secure registry with said end, 198, of bracket, 8. Located between clamp 194, and end 198 of bracket 8, is feeler element 9, securely held in angular association with bracket, 8, the lower end of which is positioned to contact the contoured surface of template, 5, so that as feeler element 9, contacts the surface of template, 5, at any point, blade 13 likewise contacts work piece 20 at a corresponding point of the same depth and location from the end of said work piece, 20. Bolts 196 allow clamp 194 to be released from the end, 198, of bracket 8, so that feeler element 9, may be properly adjusted to permit operation of the duplicating attachment of the instant invention as hereinafter described. Moreover, feeler member 9, may be moved forward or backward to align with the center point of template, 5. Saw blade, 13, is positioned to directly align with the center of longitudinal axis, 110. Central alignment is accomplished by means of parallel positioning of shaft, 160, directly over longitudinal axis, 110, of work piece, 20.

Journaled within spaced roller bearing housings, 16, which are located behind lathe 1, is a steel pipe or bar, 15. Steel bar, 15, is freely moveable within bearing housings, 16, so that said bar, 15, is permitted both rotational and longitudinal movement within said bearing housings, 16. Bearing housings, 16, are spaced apart at least the distance of any work piece turned on lathe, 1. However, the length of bar, 15, must be a minimum equal to three times the length of work piece, 20, so that any point located between bearing housings, 16, on bar, 15, may be displaced along the longitudinal axis of bar, 15, by moving bar 15 longitudinally without either end of bar 15 being disengaged from bearing housings, 16.

Figure 5:
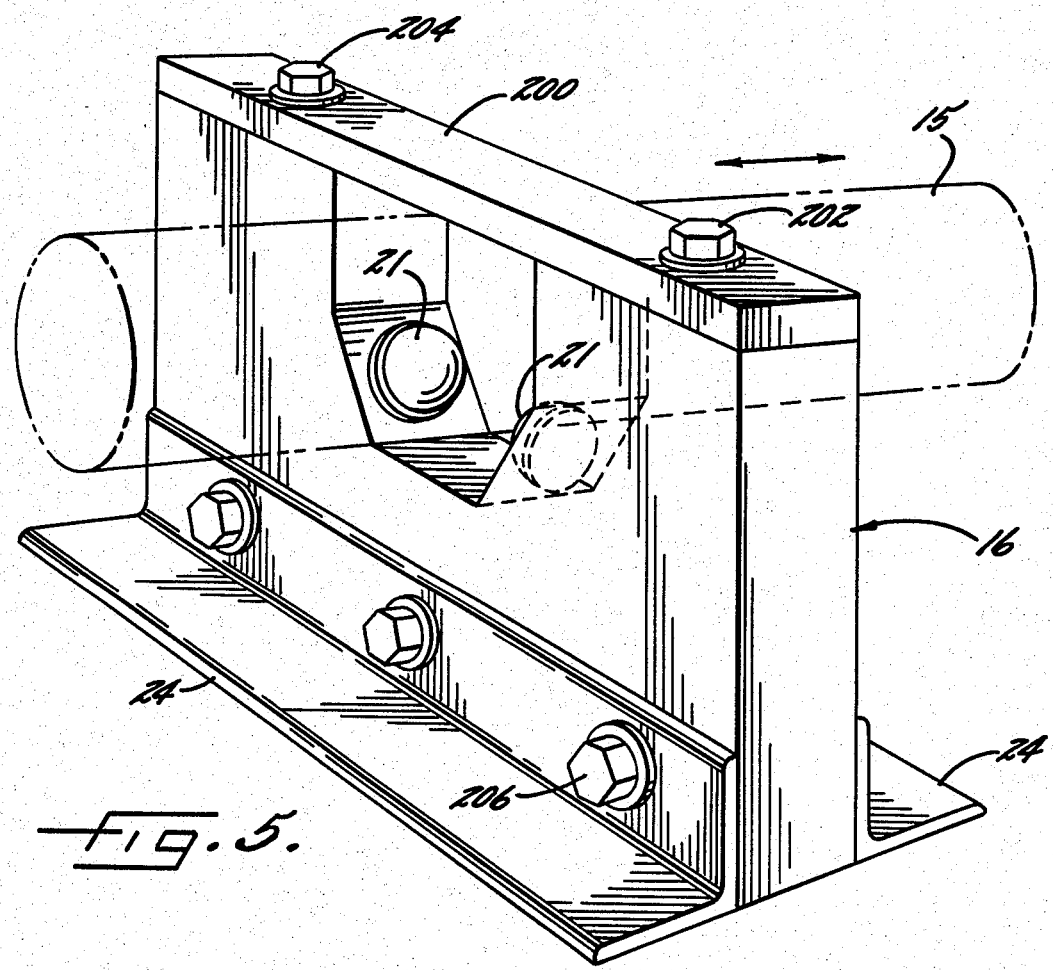
FIG. 5 is a prospective view of the bearing element of the duplicating attachment of the present invention.

Support plate, 14, is integrally attached to the mid point of bar 15, by any mechanical expedient such as welding. Therefore, a saw blade 13 is moved by the operator from left to right, bar 15, also moves longitudinally the same distance. Bearing housings, 16, may be made of wood or metal or any suitable material and houses roller bearings, 21, as shown in FIG. 5. In order to remove bar, 15, without removing support plate, 14, or bearing housings, 16, removeable strips, 200, are bolted into the top of bearing housings, 16, by means of bolts, 202 and 204, as shown in FIG. 5. Housing, 16, also includes flanges, 24, which permit bearing housings, 16, to be securely fastened to the top surface of table, 100, behind lathe, 1. Bolts such as the one shown in FIG. 5, at 206, connect flanges 24, to bearing housings, 16.

Figure 4:
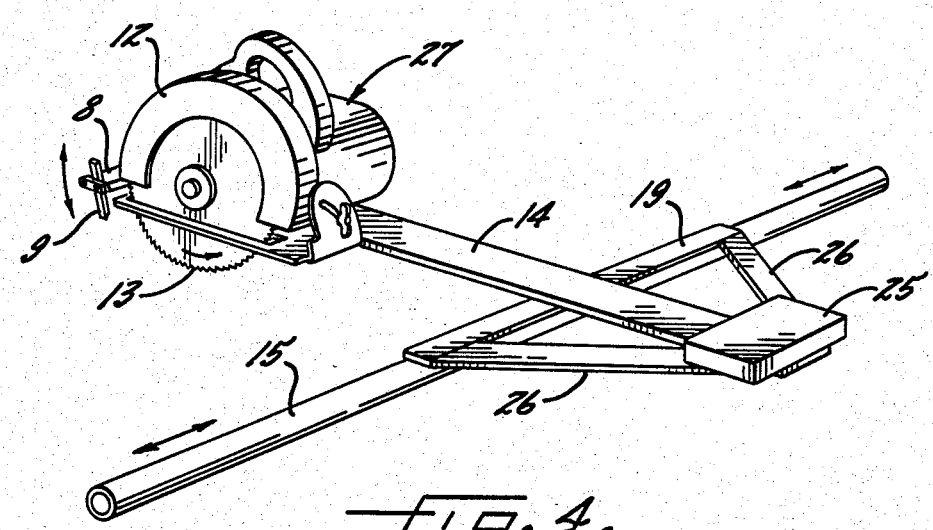
FIG. 4 is a prospective view of the carriage assembly of the present invention which utilizes a portable hand circular saw as the cutting element for the duplicating attachment of the present invention.

The backward distal end of support plate, 14, extends beyond bar 15 as shown in FIGS. 2, 3, and 4, for counter balance purposes. When the cutting blade utilizes hand circular saw, 27, the weight of the saw makes the use of additional counter weights, such as 25 in FIG. 4, more advantageous for ease of operation. Counter weight, 25, is laterally supported by means of braces 19 and 26.

Moreover, bearing housings, 16, are each equipped with angle brackets, 17, secured to the rear of bearing housings, 16, in order to displace rest, 18, which is a length of wood or metal securely attached to brackets, 17. Rest, 18, holds motor, 7, or counter weight, 25, when cutting blade, 13, is not in use. The weight of motor 7 or counter weight 25 allows the operator to tilt the said motor, 7, or counter weight, 25, onto a rest position located on member 18 to hold cutting blade, 13, off of work piece, 20. When tilted forward, the weight of the cutting assembly, causes more precise operation and less displacement of cutting blade, 13, when in operation.

Guard, 12, may also be designed to incorporate utility as a handle for use by the operator to help guide the cutting blade 13.

OPERATION

In actual operation, the attachment of the present invention must first be properly positioned on a mounting surface adjacent to a conventional turning lathe. Initially, the template or pattern assembly must be installed between the operator and the lathe. The template or pattern, 5, to be copied, is supported on an integral assembly, 130, comprised of support elements 132, 2, 3, and 4. The pattern or template, 5, to be copied is then installed on solid horizontal support member, 4, by clamping, screwing, or gluing.

In addition, cutter assembly, 150, is installed on the rear side of lathe, 1. The cutter assembly is supported and attached to the upper surface of lathe table, 100, by means of bearing housings, 16, and flanges, 24. Slideably and rotateably mounted within roller bearings, 21, located in bearing housings, 16, is a steel rod or pipe, 15. Fixedly attached to the mid point of rod, 15, is a support plate, 14, upon which a rotateably mounted saw blade is attached and held into position by bearing, 11. On the opposite end of support plate, 14, is a conventional motor, 7, which drives saw blade, 13. Saw blade, 13, is disposed at an angle to the work piece to facilitate the moveable cutting operation.

After a length of rotateable stock or a work piece, 20, is installed on lathe, 1, the saw is positioned so that when feeler element, 9, located adjacent to the front of support plate, 14, contacts the template, 5, the saw is permitted to contact a corresponding point at a corresponding depth of the work piece, 20. The operator then actuates the saw blade, 13, and lathe, 1, and then pivots rotating saw blade, 13, into contact with rotating work piece, 20, until it cuts a depth into the work piece, 20, of equal dimension to the depth contacted by the feeler member, 9. As the feeler member, 9, approaches the surface of template, 5, by rotating the feeler member, 9, toward the template, saw blade, 13, contacts rotating stock, 20. As the feeler member, 9, is permitted to trace the contour surface of template, 5, saw blade, 13, cuts a corresponding contour on work piece, 20. Thus it can be seen that an exact duplicate of template, 5, is created from work piece, 20.

Moreover, saw blade 13 may be powered by a circular hand power saw which may be mounted on support plate, 14, and the necessity for motor, 7, would then be eliminated.

It should be apparent that an improved apparatus for duplicating a particular pattern on a conventional lathe has been described. While the invention has been shown in only one primary embodiment with one alternative power source, many other modifications, changes, and substitutions in the detailed construction and combination and arrangement of elements may be employed without departing from the spirit and scope of the invention.

I claim:

1. A duplicating attachment for conventional turning lathe including means for supporting and rotating a work piece comprising: a support means for holding stationary, a template in a plane parallel to a rotating work piece and located at a position between the lathe operator and the work piece; a cutting means comprising a circular saw blade being rotated by an electric, power driven portable circular saw located above the work piece and being supported by a pivotal mounting located to the rear of the work piece which allows said cutting means to move both laterally and pivotally in contact with the work piece; and said cutting means being fixedly attached and supported on a frame comprised of a laterally sliding cylindrical bar, sliding within a pair of bearing surfaces and which is also permitted to rotate forward or backward to permit movement of the said cutting means in or out of contact with said rotating work piece; said cutting means further having a safety guard shielding the said cutting blade; said safety guard being designed to permit double utility as a handle to pivot and also to laterally guide the said cutting means manually into contact with the work piece in order to shape the work piece; and said cutting means having a displaced counterbalance means to facilitate cutting control; and a lateral cutting means rest comprising a rigid bar extending the full length of the lathe and located below and to the rear of the said cutting means and providing a stop upon which the said counterbalanced cutting means is permitted to rest when not in use, said counterbalance being disposed to the rear of said cutting means and being of sufficient weight to pivot the cutting means away from the work piece when not in use and coming to rest upon said cutting means rest; and a feeler element attached to the cutting means support which contacts the contour surface of the template to limit the cutting means contact to the said work piece, causing the cutting means to shape the work piece to an exact replica of the template contour as the cutting means is moved along the work piece in conjunction with the movement of the feeler element along the contour of the template.

* * * * *